United States Patent [19]

Kilstrom et al.

[11] E Re. 29,247

[45] Reissued June 7, 1977

[54] SURFACE TREATING ATTACHMENT DEVICE

[75] Inventors: Lars Gunnar Kilström, Taby; Goran Arvid Henning Ridderstrom, Stockholm, both of Sweden

[73] Assignee: Aktiebolaget Electrolux, Stockholm, Sweden

[22] Filed: May 5, 1976

[21] Appl. No.: 651,478

Related U.S. Patent Documents

Reissue of:

[64] Patent No.: 3,864,784
Issued: Feb. 11, 1975
Appl. No.: 338,370
Filed: Mar. 5, 1973

[30] Foreign Application Priority Data

Feb. 7, 1973 Sweden ..... 7301671
Mar. 7, 1972 Sweden ..... 2834/72

[52] U.S. Cl. ..... 15/380; 15/387; 51/170 MT; 285/7; 285/325

[51] Int. Cl.[2] ..... A47L 5/30; A47L 9/24

[58] Field of Search ..... 15/380, 381, 387; 51/170 MT; 285/325, DIG. 4, DIG. 7, 7

[56] References Cited

UNITED STATES PATENTS

| | | | |
|---|---|---|---|
| 360,779 | 4/1887 | Moss | 285/325 |
| 1,020,002 | 3/1912 | Warner | 285/DIG. 4 |
| 2,338,339 | 1/1944 | LaMere et al. | 15/387 UX |
| 2,477,681 | 8/1949 | Anderson | 15/387 X |

*Primary Examiner*—Christopher K. Moore
*Attorney, Agent, or Firm*—Alfred E. Miller

[57] ABSTRACT

A surface treating device such as a surface grinder in which power is transmitted to the operative elements of the assembly by a flowing gas, for example, air. The device is attached to a source of at least a partial vacuum, such as a vacuum cleaner. The motor fan unit of the vacuum cleaner together with a rotatable fan housed in the device form the power generating source which in turn operates the grinding member of the surface treating device in order to treat the work surface with an oscillating motion in a plane generally parallel thereto.

15 Claims, 7 Drawing Figures

SURFACE TREATING ATTACHMENT DEVICE

Matter enclosed in heavy brackets [ ] appears in the original patent but forms no part of this reissue specification; matter printed in italics indicates the additions made by reissue.

The present invention relates to a surface treating attachment device which is connected directly, or indirectly by a hose, to a source of at least a partial vacuum, such as a vacuum cleaner, and a fan wheel in the device which is directly in the path of air flow and is operable thereby.

BACKGROUND OF THE INVENTION

It is known to use a flowing gas, such as air, as a power transmitting medium to a surface treating device. The device may be connected to the suction opening of a vacuum cleaner in order to produce a sufficient air flow to operate the surface treating device.

When air is used as a power transmitting medium, the device has a decided advantage over mechanical drive structures in its great flexibility. Moreover, the risk of the motor being damaged in the case of an overload is much smaller than in the case of a direct electric motor drive. Furthermore, it should be noted that a variety of tools can be selectively connected to the output shaft of the rotating fan unit, such as replaceable grinding, rubbing, brushing, scrubbing, or polishing tools. It will also become apparent that the same flowing air which operates the rotating fan unit can be used to carry away the particles of grinding dust materials.

A number of serious disadvantages have arisen in the use of air-operated grinding apparatus of the above-described type. One disadvantage is that the known grinding apparatus, after a short period of use, becomes clogged due to the accumulation of grinding particles in the air flow channels. This is especially true in the air paths to the rotating fan unit of the surface grinder. When the fan unit becomes clogged, a time consuming disassembly and cleaning operation becomes necessary. A further disadvantage of the known grinding apparatus construction is that the results of using a rotating grinding or polishing attachment are not satisfactory since very often circular marks are left on the work surface which cannot be eradicated.

It is an object of the present invention to overcome the aforesaid disadvantages by providing a surface treating attachment device in which the clogging of the rotating fan unit is effectively prevented, and at the same time, a much better surface treatment of the work area is achieved.

It is another object of the present invention to provide a means on the blades of a rotating fan unit for converting the rotating motion of this unit to an oscillating motion.

Another object of the present invention is to provide flow paths to the rotating fan unit of the proper dimensions in order to eliminate the possibility of the clogging of the fan unit assembly by dust particles generated by the grinding operation.

A further object of the present invention is to provide a unique handle construction in order to prevent or to substantially reduce or cushion the vibrations from being carried from the grinding mechanism to the handle.

An object of the present invention is to provide a quick connect and disconnect coupling for a vacuum cleaner hose which positively maintains the required vacuum in the device.

Another object of the present invention is to provide alternate embodiments of the present invention in which the surface treating device has a low overall structural height so that it can be easily operated under low furniture and the like.

The invention will now be more fully described with reference to the accompanying drawings in which.

PREFERRED EMBODIMENTS OF THE INVENTION

Figure 1:
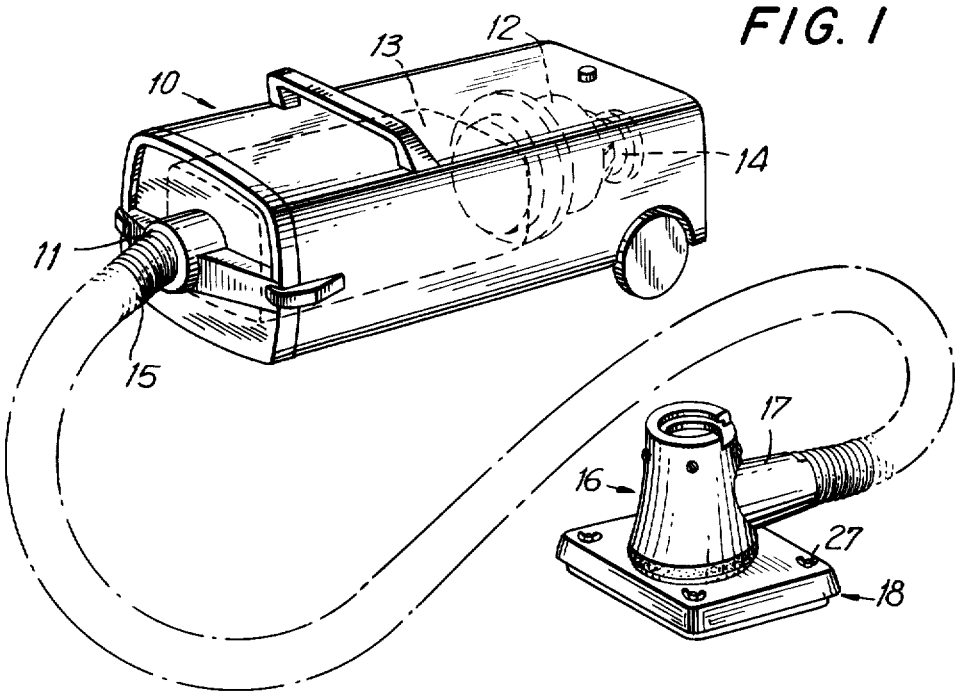
FIG. 1 is a perspective view of the surface treating device attached to a household vacuum cleaner and constructed in accordance with the teachings of the present invention.

A vacuum cleaner of a known type is shown in FIG. 1 and is referred to generally by the number 10. The vacuum cleaner has a suction opening 11 from which atmospheric air is drawn by a motor fan unit 12 through a dust collector 13. The clean air coming from the outlet of the dust collector exits to the ambient through the exhaust opening 14 of the vacuum cleaner 10.

The surface treating attachment device referred to generally by the numeral 16 is shown connected to the suction opening 11 of the vacuum cleaner 10 by means of a flexible hose 15. However, it is within the scope of the present invention to provide a direct attachment of the present device to the suction opening of the vacuum cleaner. The surface treating attachment device 16 is connected to one end of the hose 15 by a handle shaped part 17 which is the upper portion of the device while the working member referred to generally by the numeral 18 engages the floor or other surfaces to be treated.

Figure 2:
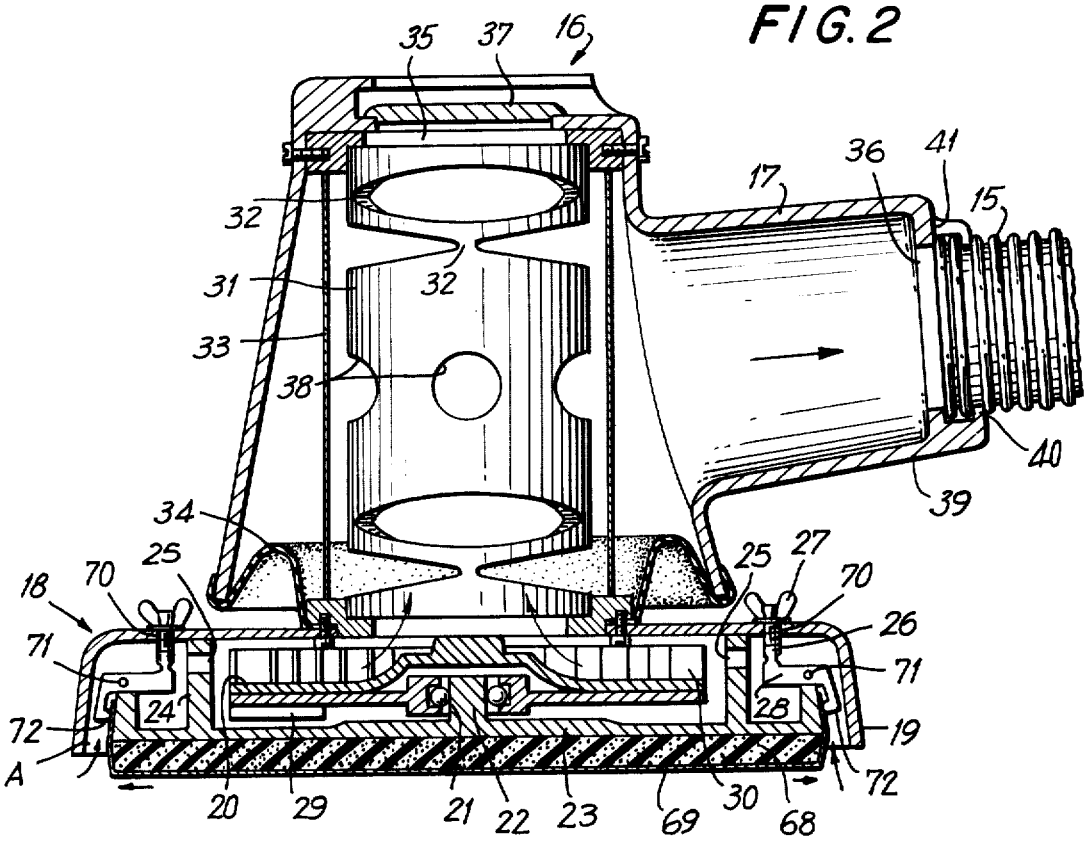
FIG. 2 is a vertical cross-section on a larger scale showing the surface treating device in detail.

Referring now particularly to FIG. 2, the working member 18 comprises a skirt 19 that is open on the bottom and encloses a rotatable fan wheel 20. The latter is rotatably mounted on ball bearings 21 about a stub shaft 22 that is connected to the horizontally disposed base plate 23. The base plate 23 is provided with an annular wall 24 which extends upwardly and surrounds the fan wheel 20 at a given distance therefrom and is provided with a plurality of air inlet openings 25. A substantial annular gap A exists between the circumferential periphery of the base plate 23 and the adjacent interior surface of the skirt 19 whereby air flows through the gap and through the openings 25 to the vanes of the fan wheel 20. It will be noted that the undersurface of the base plate 23 is provided with a layer of resilient material 68, such as foam rubber.

Secured to the underside of the foam rubber is a sheet of grinding paper 69 for grinding treatment of the work surface. The base plate 23 is fastened to the skirt 19 by means of threaded bolts 26 passing through holes 70 in the skirt 19. The bolts 26 are integral with the lever 28 which is pivoted at 71 on the base plate 23. The free end 72 of the lever 28 engages the edge of the grinding paper 69 and holds it in firm contact with the periphery of the base plate 23 when the nuts 27 on the threaded bolts 26 are tightened. Thus, the grinding paper 69 is maintained in place on the base plate 23.

A weight 29 is shown secured to a part of the underside of the rotatable fan wheel 20 adjacent to the periphery thereof. Because the weight 29 is positioned eccentrically on the fan wheel 20, the center of gravity of the rotating fan wheel will be outside of its center of rotation. Thus, the constant air flow through the device causes the fan wheel 20 to operate, but because of its unbalance, the wheel makes an oscillating motion.

The present surface treating attachment device operates as follows: The vacuum cleaner 10 is turned on and the motor fan unit 12 becomes operative thereby drawing atmospheric air through the gap A between the skirt 19 and the base plate 23, and then through the openings 25 in the wall of the base plate 23 to the vanes 30 of the rotatable fan wheel 20. The dust laden air continues to flow through the handle-shaped part 17 and the flexible hose 15 to the suction inlet 11 of the vacuum cleaner 10. Since the weight 29 is mounted eccentrically on the fan wheel 20, the movement of the wheel due to an unbalance is changed to an oscillating movement. This motion is transmitted to the base plate 23 having the grinding paper 69 securely mounted thereon and consequently the base plate will oscillate over the work surface in a movement which is generally parallel thereto. The dust created by the grinding operation is drawn by the air under at least a partial vacuum through the rotating wheel 20 and air channels to the dust collector 13 of the vacuum cleaner 10. Because of the vigorous vibration exerted on the entire working member 18 there is no risk of clogging of the air paths by dust particles. Consequently, the rotating fan wheel 20 is virtually self-cleaning.

Figure 3:
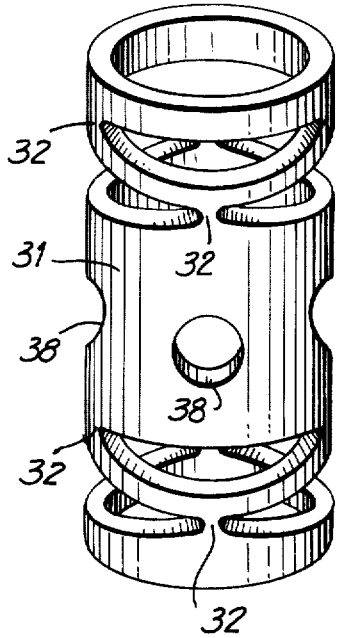
FIG. 3 is a perspective view of the energy absorbing coupling member that is positioned between the handle and the oscillating working member of the surface treating device.

Because of the rather considerable vibration created by the present construction, it is important to prevent the vibrations in the working member 18 from being carried to the handle of the device. The handle part 17 is therefore provided with a coupling member, as particularly seen in FIGS. 2 and 3, which effectively absorbs the vibrations of the operative device yet permits excellent guidance of the working member. The coupling member, shown in detail in FIG. 3, comprises a cylindrical tube 31, the lower end of which is attached to the upper surface of the skirt 19 and the upper end is clamped under the upper part of the handle shaped part 17. As seen in FIG. 3, the tube 31 has four joints 32 disposed at opposite ends of the tube and arranged substantially at right angles to each other in pairs. It will be noted that each joint is formed by two diametrically opposed wall portions of the tube. Those parts of the wall which are between two wall portions of the tube form one and the same joint and are removed. The tube 31 is constituted of a resilient material, such as polypropylene, so that the joints will effectively absorb all radial forces caused by the vibrating working member which acts on the tube 31. The tube construction maintains a satisfactory stiffness for the rotational movement around the longitudinal axis of the tube whereby the precise guiding of the operative working member is ensured.

As seen in FIG. 2, three rods 33 are shown within the handle part 17. The rods 33 tend to maintain a constant distance between the undersurface of the handle part 17 and the upper surface of the skirt 19. The space formed between the side walls of the handle part 17 and the mounting place of the tube 31 on the skirt 19 is connected and sealed by a diaphragm 34, which also allows some relative movement between the working member 18 and the handle part 17.

Referring to FIG. 2, the handle part 17 has two openings 35 and 36 into either one of which the vacuum cleaner hose 15 can be connected. However, the opening which is not used is closed by a sealing plate 37. In order to ensure the satisfactory flow of air in the hose connection adjacent to the opening 36, the median part of the tube 31 is provided with a plurality of spaced holes 38.

Figure 4:
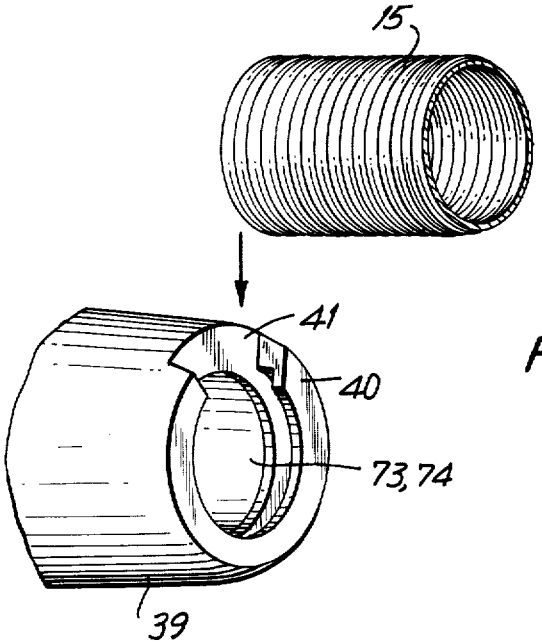
FIG. 4 is a perspective view of the outlet connection of the surface treating device, and a section of the vacuum cleaner hose which is removably attachable thereto.

As seen in FIG. 4, a tubular outlet connecting piece 39 is illustrated at one end of the handle part 17. One end of hose 15 having annular segments is adapted for insertion in the openings 73 and 74 of the tubular piece 39. The extreme end of the tubular piece 39 is in the form of an inwardly turned collar 40. It will be noted that both the tubular piece 39 and the collar 40 are partly split open in order to permit the side insertion of one end of the hose 15, as shown by the arrow in FIG. 4. The hose 15 is slightly compressed upon insertion through the slot 41 and into the openings 73 and 74 of tubular piece 39. When the hose is properly in place in the circular opening, the hose springs back to its natural circular form and the inwardly turned collar 40 engages the annular end segment of the hose 15 and securely locks the hose relative to the opening.

Figure 5:
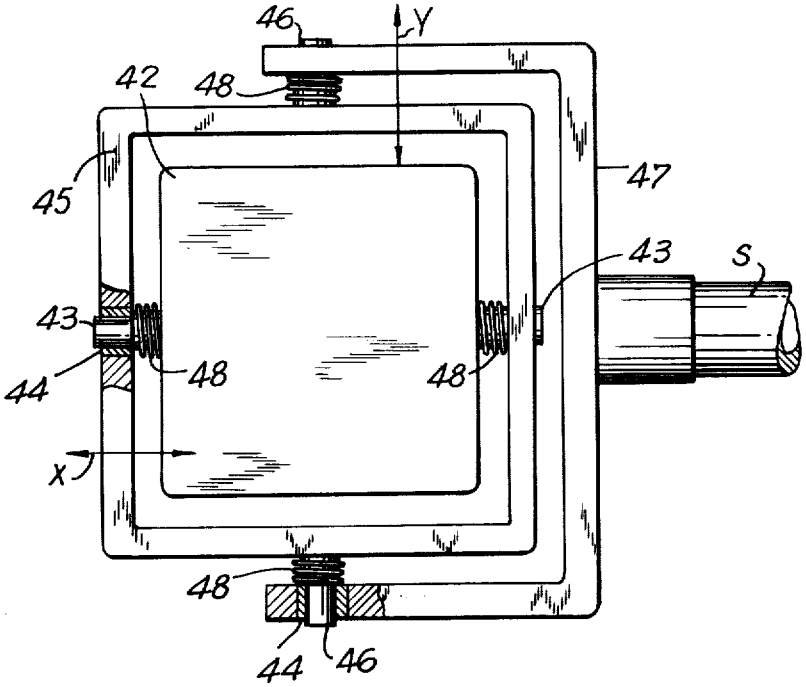
FIGS. 5, 6 and 7 are diagrammatic illustrations of alternate embodiments of the energy absorbing coupling member which are specifically constructed to reduce the overall constructional height of the device.
Figure 6:
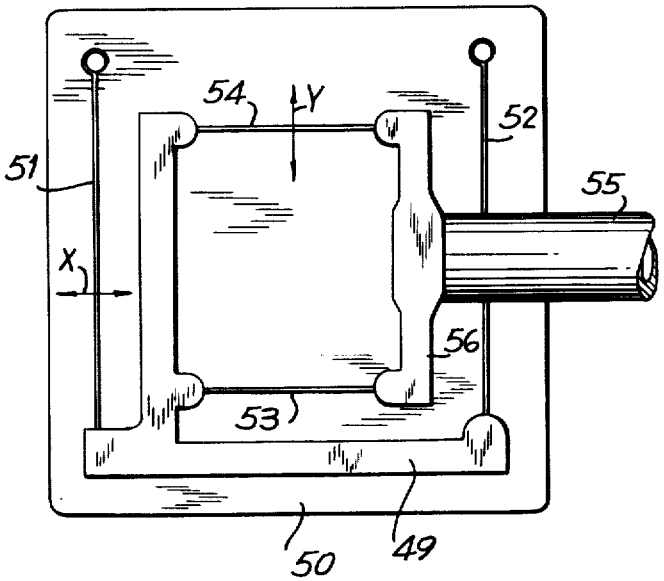
Figure 7:
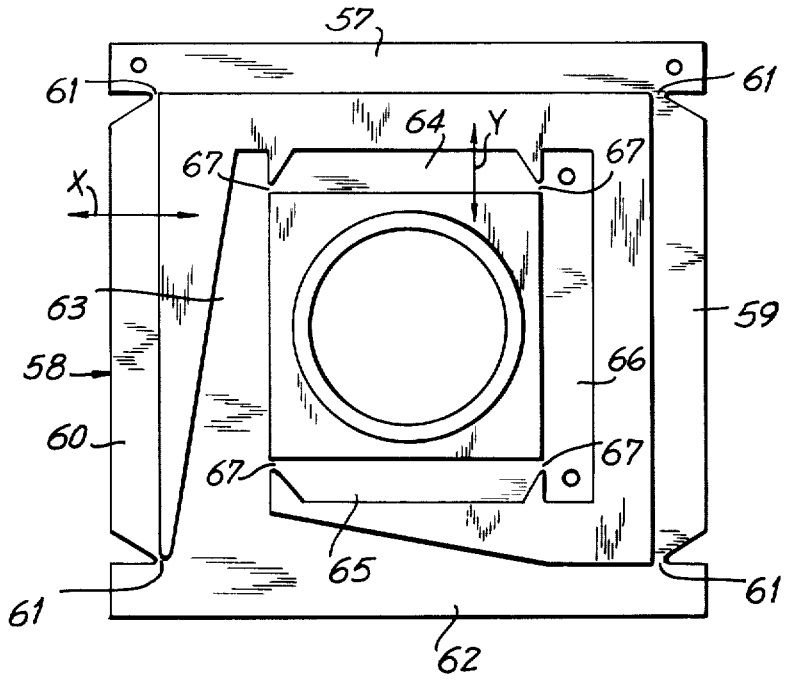

There are some occasions, when using the floor treating apparatus, that it is desirable to have a structure with a low overall height thereby making it possible to surface treat a floor under low furniture and the like. FIGS. 5, 6, and 7 show diagrammatically various coupling arrangements which reduce all components to the same generally horizontal plane.

Referring to FIG. 5, the working member which is similar to member 18 is designated by the reference numeral 42 and has on opposite sides two pins 43 supporting the member in holes 44 in a rectangular frame structure 45. The frame 45 is in turn supported by pins 46 in a bracket 47 to which is connected an operating shaft S, not shown in detail. The through connecting line between the pins 46 is generally at right angles to the through connecting line between the pins 43. Between the outer edge of the working member 42 and the inside of the frame 45 as well as between the outer edge of the frame 45 and the inside of the bracket 47, resilient elements 48 are arranged, the first of which absorb the movement of the working member 42 in the direction designated by the arrow X and the other two absorb the remaining movement in the direction designated by the arrow Y. The desirable result of this construction is that the bracket 47 and hence also the operating shaft S will be cushioned from the vibrations of the working member 42.

Another embodiment of the coupling arrangement is shown in FIG. 6, in which a generally L-shaped bracket 49 is attached to the oscillating working member 50 by two elongated springs 51 and 52, which absorb the movement in the direction designated by the arrow X. The remaining movement in the direction designated by the arrow Y is absorbed by two elongated springs 53 and 54 each attached at one end to the bracket 49 so that the operating shaft 55, which is connected to the other ends of the springs 53 and 54 by a bracket 56, will be substantially without vibrations.

A further embodiment of the invention is shown in a top view of FIG. 7. In this construction, the working member is assumed to be connected to a wall 57 of a frame structure 58 of elastic material, such as polypropylene. Walls 59 and 60 of the frame 58 which are adjacent to the wall 57 have thinned portions 61. The walls 59 and 60 are joined by a wall 62 which by means of part 63 passes inwardly to form an inner frame structure with walls 64 and 65 as well as a wall 66, which joins the walls 64 and 65 and is generally parallel to the part 63. In addition, the walls 64 and 65 have thinned portions 67 at their connections to the part 63 and the wall 66, respectively, which thinned portions together with the thinned portions 61 act as the resilient elements shown in FIGS. 5 and 6, i.e., the portions 61 absorb the movement in the direction X and the portions 67 absorb the movement in the direction Y such that the wall 66 and an operating shaft connected to it, but not shown, will be free from vibrations in the same way as shown and described in the embodiments illustrated in FIGS. 5 and 6. Also, in this embodiment the requirement for a low structural height is satisfied because all frame parts are situated generally in the same horizontal plane.

What is claimed is:

1. A surface treating attachment device adapted to be connected to a source of at least a partial vacuum comprising: an air flow channel extending from a location adjacent to the surface to be treated to said vacuum source, a rotatable fan wheel in said air flow channel, a handle-shaped part, said fan wheel having a weight placed outside the axis of rotation thereof whereby movement of the fan wheel by the air striking the vanes of the fan wheel generates an oscillating motion, a surface engaging working member operatively connected to said fan wheel whereby the oscillating motion generated by the fan wheel is transmitted to the working member which in turn oscillates in a plane that is generally parallel to the work surface, and energy absorbing means for operatively connecting said handle-shaped part to said working member which absorbs the movement of the working member in two directions that are generally perpendicular to each other.

2. A surface treating attachment device as claimed in claim 1 further comprising a skirt housing said fan wheel, a base plate for said working member and a dust collector in said vacuum source, said working member being secured to the underside of said base plate, and a plurality of passageways being provided in the base plate for conveying dust-laden air via the fan wheel to said dust collector.

3. A surface treating attachment device as claimed in claim 1 wherein said energy absorbing means are members which absorb in pairs the movement of the working member, said members being arranged substantially in the same horizontal plane.

4. A surface treating attachment device as claimed in claim 3 wherein said members are resilient elements positioned in two supporting locations between said working member and said handle-shaped part, the imaginary lines through the two supporting locations are substantially perpendicular to each other.

5. A surface treating attachment device as claimed in claim 4 wherein said resilient elements are metal springs.

6. A surface treating attachment device as claimed in claim 4 wherein said resilient elements are constituted of an elastic material.

7. A surface treating attachment device as claimed in claim 4 wherein said resilient elements are constituted of a plastic material.

8. A surface treating attachment device as claimed in claim 7 wherein said resilient plastic elements are constituted of polypropylene.

9. A surface treating attachment device as claimed in claim 1 further comprising a skirt housing said fan wheel, said skirt supporting said handle-shaped part, and said energy absorbing means including four joints arranged in pairs in different planes but substantially parallel to the work surface and operatively connecting said working member to said handle-shaped part, one joint of a pair being located at right angles to the other joint thereof, said joints co-acting to absorb radial forces caused by the oscillating working member but are of sufficient rigidity to precisely guide said working member.

10. A surface treating attachment device as claimed in claim 9 wherein said joints are formed by wall portions in a cylindrical tube, said wall portions being in pairs located diametrically opposite to each other.

11. A surface treating attachment device as claimed in claim 10 wherein said tube is constituted of an elastic material.

12. A surface treating attachment device as claimed in claim 11 wherein said tube is polypropylene.

13. A surface treating attachment device as claimed in claim 10 further comprising a spacing element positioned between the handle-shaped part and said skirt which maintains a constant distance therebetween.

14. A surface treating attachment device as claimed in claim 13 wherein said spacing element comprises at least three rods arranged about said tube.

15. A surface treating attachment device as claimed in claim 1 wherein said handle-shaped part is provided with a tubular piece having at its outer end a radially split inwardly turned collar, and a hose having one end adapted for insertion laterally through the slot formed by said radial split in the outer end of the tubular piece and engaged by the inwardly turned collar of the tubular piece.

* * * * *